(No Model.)
H. W. HOEFT.
SPROCKET WHEEL.
No. 512,822. Patented Jan. 16, 1894.
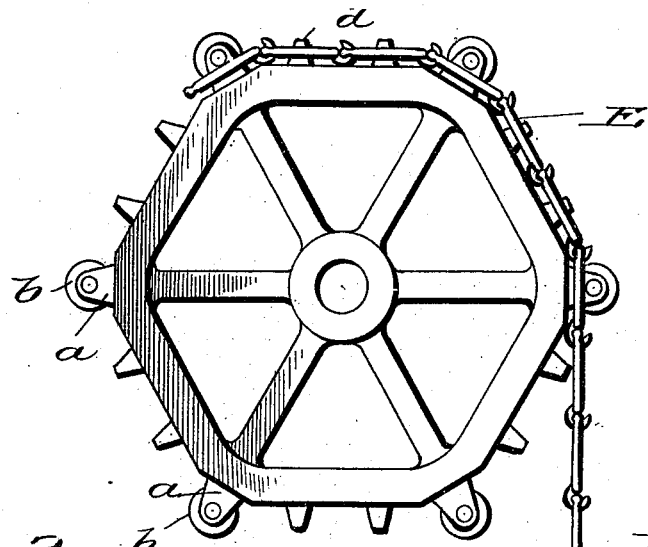
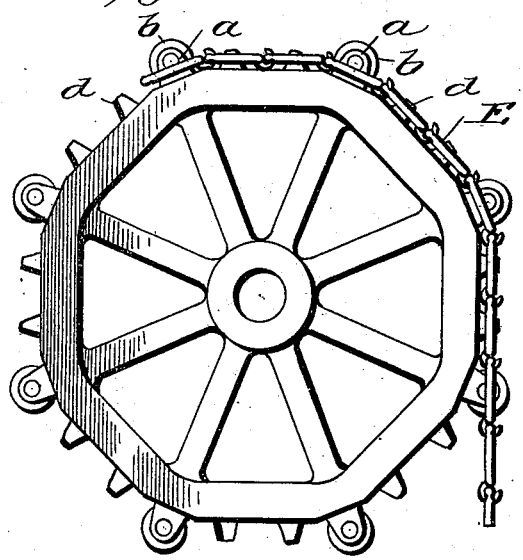 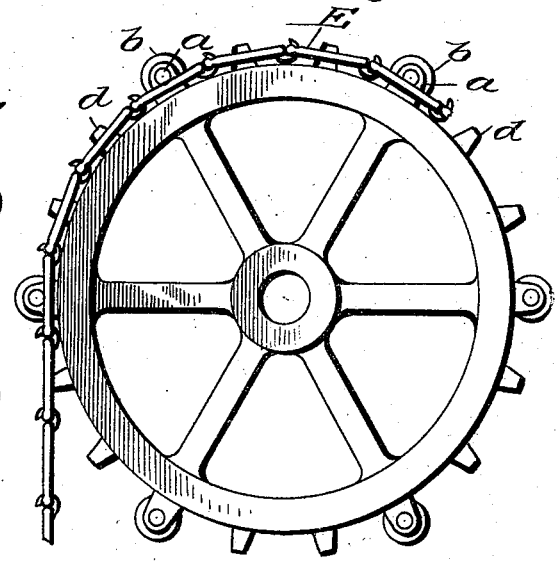
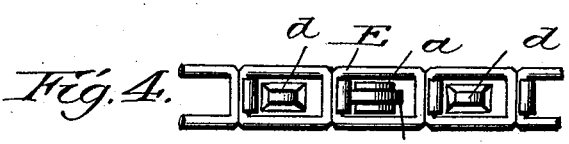
Witnesses
Inventor
Hermann W. Hoeft.
By Attorneys

UNITED STATES PATENT OFFICE.

HERMANN WILLIAM HOEFT, OF LA CROSSE, WISCONSIN.

SPROCKET-WHEEL.

SPECIFICATION forming part of Letters Patent No. 512,822, dated January 16, 1894.

Application filed August 31, 1893. Serial No. 484,493. (No model.)

*To all whom it may concern:*

Be it known that I, HERMANN WILLIAM HOEFT, a citizen of the United States, residing at La Crosse, in the county of La Crosse, State of Wisconsin, have invented certain new and useful Improvements in Sprocket-Wheels for Bicycles; and I do hereby declare the following to be a full, clear, and exact description of the invention, such as will enable others skilled in the art to which it appertains to make and use the same.

This invention relates to sprocket wheels and chains for bicycles.

The object of the invention is to diminish friction and obviate the loss of power occasioned thereby.

The improvement consists essentially of a sprocket wheel having the sprockets disposed at proper intervals and provided with small wheels or pulleys and having guides disposed between the said sprockets for the purpose of simply holding the sprocket chain in relative position on the wheel and not designed to sustain any of the pulling force.

The improvement also consists of the novel features and the peculiar construction and combination of the parts which will be hereinafter more fully described and claimed and which are shown in the annexed drawings, in which—

Figure 1 is a side elevation of a hexagon shaped wheel showing the application of the invention. Fig. 2 is a view similar to Fig. 1 of an octagon shaped wheel showing the application of the invention thereto. Fig. 3 is a side elevation of a wheel of ordinary construction showing the application of the invention. Fig. 4 is a top plan view of a portion of a wheel showing the relative position of the guide and the link of a sprocket chain.

In the drawings similar letters refer to corresponding parts in the different views.

The spurs $a$ are provided in pairs, preferably opposite the spokes of the wheels and are adapted to have the pulleys $b$ journaled between them. The spurs $a$ and the pulleys $b$ journaled therein may be considered as a single spur, the purpose of the pulleys $b$ being simply to relieve friction as the links of the sprocket chain engage therewith either in making contact or becoming disengaged therefrom. The spurs $a$ are located at such relative distances apart as to receive two or more links of the chain between them thereby obviating the friction which would be incident to each link being provided with a corresponding spur on the wheel. Between the spurs is provided a series of guides or projections $d$ which are disposed so as to enter the links on the chain and hold the same on the periphery of the wheel. These guides $d$ are wedge shaped or tapering projections and are adapted to enter the links of the chain without sustaining any of the pulling force thereon.

The sprocket chain E is composed of a series of links which are adapted to be detachably coupled together to admit of a link being readily removed in the event of breakage or for any other desired purpose.

The shape of the wheel, whether circular or polygonal sided is immaterial to the essence of the invention, but it is preferred to have the wheel polygonal sided as shown in Figs. 1 and 2, as the angle formed between the adjacent or contiguous sides assists materially in sustaining the pulling force for the transmission of power.

Having thus described my invention, what I claim, and desire to secure by Letters Patent, is—

1. A sprocket wheel having engaging spurs provided with pulleys, and having guide projections between the said engaging spurs, substantially as and for the purpose set forth.

2. A polygonal sided sprocket wheel having engaging spurs at the angles and having guide projections on the straight sides between the engaging spurs, substantially as and for the purpose set forth.

In testimony whereof I affix my signature in presence of two witnesses.

HERMANN WILLIAM HOEFT.

Witnesses:
JOHN J. ESEH,
FRANK WINTER.